No. 625,988. Patented May 30, 1899.
A. T. SNELL.
LAWN SPRINKLER.
(Application filed July 28, 1896.)

(No Model.)

Witnesses
W. R. Edelen
Theo. T. Snell

Inventor.
Arthur T. Snell
by Arthur F. Browne
his Attorney

THE NORRIS PETERS CO., PHOTO-LITHO., WASHINGTON, D. C.

UNITED STATES PATENT OFFICE.

ARTHUR T. SNELL, OF LOS ANGELES, CALIFORNIA, ASSIGNOR, BY MESNE ASSIGNMENTS, TO BARNEY A. BENJAMIN, OF SAME PLACE.

LAWN-SPRINKLER.

SPECIFICATION forming part of Letters Patent No. 625,988, dated May 30, 1899.

Application filed July 28, 1896. Serial No. 600,770. (No model.)

*To all whom it may concern:*

Be it known that I, ARTHUR T. SNELL, of Los Angeles, in the county of Los Angeles and State of California, have invented certain new and useful Improvements in Lawn-Sprinklers, of which the following is a specification.

My invention relates to that class of sprinklers wherein the water to be distributed is broken into spray by a winged or bladed rotatable wheel; and it consists in so disposing said wheel and other parts of the device as to overcome the objectionable features which exist in other sprinklers now on the market.

I have illustrated my improved sprinkler in the accompanying drawings, wherein—

Figure 1:
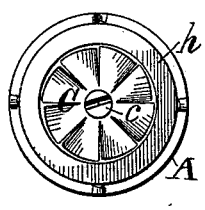
Figure 2:
Figure 3:
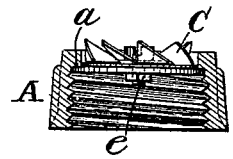
Figure 4:
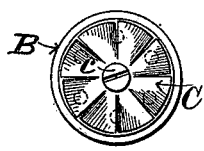
Figure 5:
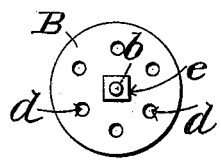
Figure 6:
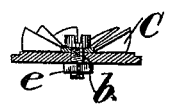
Figure 7:
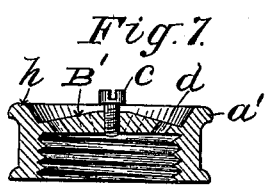
Figure 8:
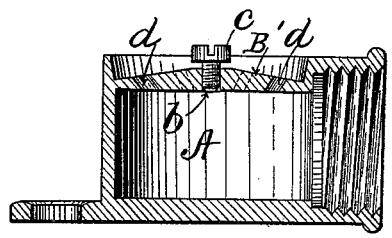
Figure 9:
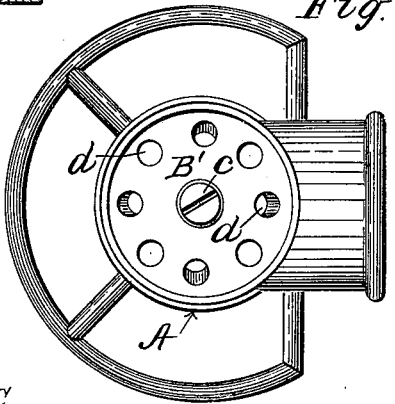
Figure 10:

Figure 1 is a top or end view of one of the simplest forms of the device; Fig. 2, a side view of the same, and Fig. 3 a vertical sectional view. Figs. 4, 5, and 6 show the construction of the winged or bladed wheel and the perforated disk to which it is attached. These figures illustrate the essential features of my invention in a sprinkler adapted to be used when the hose to which it is fastened is preferably held in the hands of the user. Fig. 7 is a sectional view of a modification. Figs. 8 and 9 are views of the same applied to a device for supporting it on the ground when the sprinkler is in operation. Fig. 10 shows a modification of the wheel adapted for use with the casings of Figs. 7 and 8.

My improved sprinkler is composed of the hollow cylindrical casing or nozzle A, the perforated disk or plate B, and the winged rotatable wheel C, attached to said disk or plate. The interior surface of the entrance into the casing or nozzle A, adapted for the insertion of the end of a hose, is screw-threaded, and at the other end of said casing or nozzle A is an inwardly-projecting flange $a$, the presence of which restricts the diameter of said latter opening somewhat. This projecting flange $a$ serves as a seat for the disk B, which disk may be made of metal, hard rubber, or other suitable material. Said disk B is of such diameter as to fit within the casing or nozzle A and is adapted to rest against the inner side of the inwardly-projecting flange $a$. The disk B is perforated at its center $b$ for the insertion of journal screw or pin $c$, and has also other perforations $d\ d$ between said center and outer edge for the passage of water. These latter perforations $d\ d$ may be made of any desired size, shape, or number and arranged as may be found most practicable. I generally prefer to have round holes bored obliquely through the disk B to give the water a more outward or inward throw, and I also may make the said openings crescent-shaped. If it is desired to throw or spray the water in the form of a square, I employ eight openings arranged in circular form parallel with the circumference of said disk B, the said openings being bored alternately straight and obliquely through the disk or plate B, as shown in Fig. 9. Connected loosely to the said disk B by the journal screw or pin $c$ and held thereon by the nut $e$ or other suitable means is the winged or bladed wheel C, which is adapted to rotate upon the disk B and within the inwardly-projecting flange $a$ of the casing or nozzle A, the diameter of said wheel C being less than that of the said disk B. When said disk B and wheel C are in position within the casing or nozzle A, the points or outer edges of the wings or blades of the wheel C will preferably extend a short distance above the top edge $h$ of the said casing or nozzle A.

The wheel C is preferably made of a single piece of sheet metal by slitting the same a number of times at like intervals from the circumference to within a short distance of the center and bending the divisions of the said metal between the said slits obliquely to form blades or wings.

The location of the rotatable wheel C within the wall of the casing or nozzle A, near the outer end of said casing or nozzle, as described and illustrated herein, is very desirable and advantageous. If the said wheel were located above the casing or nozzle, as in prior devices, a considerable quantity of water, which is stopped by coming in contact with the rotating wheel and not distributed thereby, would collect in a puddle beneath the sprinkler. I have cured this defect by the wall around the wheel, which prevents the "backwater" from running off; but it is taken up and distributed by the rotating wheel.

My invention is to be used as follows: When it is desired to break the stream of water from a hose or pipe into a spray, the disk or plate B, with the winged or bladed wheel C journaled thereto, is inserted within the cylindrical casing or nozzle A of my sprinkler through the wider and inner end thereof, the wheel C entering first and fitting freely within the inwardly-projecting flange $a$, and the said disk or plate B seats against the inner side of the inwardly-projecting flange $a$. By now screwing the end of a hose-nipple or of a pipe into the casing or nozzle A the disk B is clamped firmly in place, and the device is ready for use. The pressure of water through the hose or pipe and perforations $d\,d$ in disk B causes the winged wheel C to swiftly rotate upon the disk B on its axis $c$ as the streams of water passing through the perforations $d\,d$ in the disk B come forcibly into contact with the blades of said wheel. The rotation of the wheel C breaks the water into a fine spray, which is deflected therefrom over an extensive area. The rotation of the wheel C upon the disk or plate B causes very little friction, as the water keeps the parts cool and lubricated.

I do not limit myself to the exact construction above described. Instead of the disk B being removable, as is preferable, it may be a permanent perforated partition B' within the body A, as shown in Fig. 7, the flange $a'$ in this case projecting outwardly, and if it is desired to use my invention as illustrated in Figs. 8 and 9 of the drawings the end of the casing A immediately opposite the rotatable wheel C may be entirely closed and the opening for the insertion of a hose located at right angles to the discharge-opening. In the construction of Figs. 8 and 9 the disk is a permanent partition B', with the outwardly-projecting flange $a'$. In such case I employ any convenient supporting device to insure the upright position of the sprinkler when resting on the ground.

In all of the modifications the flange $a$ or $a'$ extends beyond the outer surface of the disk, so that a chamber for the rotatable spraying-wheel is formed below the outer rim of the casing or nozzle.

I am aware that sprinkling devices have heretofore been used having rotatable winged or bladed wheels for spraying water from a hose; but as hereinbefore stated such sprinklers have objectionable features which I believe are overcome in my improved sprinkler.

My device is simple and inexpensive, distributes water evenly, and does not easily clog up or get out of order.

If for any reason it is desired to use my improved sprinkler without the wall of the body or casing surrounding the rotary spraying-wheel, I may omit this feature, and there will remain features of my invention to which I attach importance, in which case the wheel is adapted to rotate upon the perforated disk or plate at the end of a hose or pipe without the wall of the body or casing surrounding the said wheel.

I claim as my invention—

1. In a sprinkler, a cylindrical casing or nozzle having an inwardly-projecting flange at one end and screw-threaded for attachment to a hose or pipe, in combination with a perforated disk fitting within said cylindrical casing or nozzle and seating upon the inner side of the said inwardly-projecting flange, and adapted to be held in place by said hose or pipe, and a winged or bladed wheel mounted to rotate upon said perforated disk, substantially as set forth.

2. In a sprinkler, in combination, a cylindrical casing or nozzle and a disk within said casing or nozzle having perforations arranged substantially parallel with the border or circumference of said disk, said perforations being made alternately straight and obliquely through said disk, substantially as set forth.

3. In a sprinkler, the combination of a casing or nozzle, a perforated disk removably located within the said casing or nozzle and adapted to be held in place by the hose or pipe, and a winged or bladed wheel journaled to said disk and rotating thereupon, substantially as set forth.

4. In a sprinkler, the combination of a casing or nozzle having a perforated disk within the same, and a winged or bladed spraying-wheel journaled upon said disk, said wheel having a plurality of inclined wings or blades, each wing or blade having a straight edge in close proximity to the surface of said disk and each blade extending from said straight edge at an acute angle to the surface of the disk, and the several blades covering substantially the entire surface of the disk, substantially as set forth.

In witness whereof I have hereunto signed my name in the presence of two subscribing witnesses.

ARTHUR T. SNELL.

Witnesses:
E. W. LITTLE,
JAMES B. MITCHELL.